(12) United States Patent
Le

(10) Patent No.: US 6,189,300 B1
(45) Date of Patent: Feb. 20, 2001

(54) WRAPPING MACHINE

(76) Inventor: Tuan Vinh Le, 3695 Kaneff Cres., #SPH06, Mississauga, Ontario (CA), L5A 4B6

(*) Notice: Under 35 U.S.C. 154(b), the term of this patent shall be extended for 0 days.

(21) Appl. No.: 09/365,512

(22) Filed: Aug. 2, 1999

(51) Int. Cl.[7] .................................................. B65B 9/06
(52) U.S. Cl. ............................ 53/550; 53/568; 53/374.4
(58) Field of Search .................................. 53/450, 374.4, 53/547, 549, 550, 568

(56) References Cited

U.S. PATENT DOCUMENTS

| | | | | |
|---|---|---|---|---|
| 1,320,699 | * | 11/1919 | Leumann ............................... | 53/547 |
| 3,001,351 | * | 9/1961 | Brook ..................................... | 53/547 |
| 3,417,544 | * | 12/1968 | Grevich .................................. | 53/550 |
| 4,183,193 | * | 1/1980 | Klingelhofer et al. ................ | 53/450 |
| 4,429,513 | * | 2/1984 | Beckers et al. ........................ | 53/550 |
| 5,109,654 | * | 5/1992 | Suga ....................................... | 53/550 |
| 5,775,068 | * | 7/1998 | Starsser et al. ........................ | 53/550 |

* cited by examiner

Primary Examiner—John Sipos
(74) Attorney, Agent, or Firm—Ridout & Maybee

(57) ABSTRACT

A packaging machine is shown for individually wrapping objects, such as candies. The machine has a rotary hopper for selecting the objects to be wrapped, folding them and ejecting them precisely onto a delivery conveyor. A continuous wrapping film is laid over the objects on the delivery conveyor and the sides of the film are folded downwardly to partially wrap the objects. The objects are then gripped through the wrapping film by gripping fingers mounted on a second gripping conveyor. The gripping conveyor moves the objects along while the bottom edges of the wrapper are crimped, and the wrapper between the objects is then crimped and cut off. The gripping fingers then release the wrapped object.

10 Claims, 11 Drawing Sheets

WRAPPING MACHINE

FIELD OF THE INVENTION

This invention relates to packaging machines, and in particular, to machines for individually wrapping objects, such as candies.

BACKGROUND OF THE ART

Packaging machines have been produced in the past for wrapping individual articles, such as candies. The candies usually pass along a conveyor where a continuous strip of wrapping film is laid on top of the candies and folded transversely around the candies. The peripheral edges of the wrapper can be sealed together under the candies, if desired, and the wrapping film is then transversely sealed between the candies and cut off to produce the individually wrapped candies.

There are several difficulties with the prior art wrapping machines discussed above. One is that the candies are haphazardly placed on the conveyor resulting in breaking or cracking of the candies, and this causes jamming and clean-up problems, not to mention machine down time. Another difficulty is that the candies are not located uniformly on the conveyor, so it is difficult to determine where the transverse wrapper seals should be located between the candies. Another problem is that even if the candies are located uniformly on the conveyor, the candies are allowed to shift or move around while they are being wrapped, so the wrapper seals do not occur exactly where they should. This is particularly problematic for printed wrappers, since the printing must be precisely located on the product.

SUMMARY OF THE INVENTION

The present invention ensures that the objects to be wrapped are held and positively and timely placed on the conveyor, and that the wrapper seals are located precisely by using a gripping conveyor that grips successive objects to be wrapped through the wrapping film and holds the film in place relative to the objects while the film is being sealed and cut off.

According to one aspect of the invention, there is provided a wrapping machine for individually wrapping objects. The machine comprises a delivery conveyor including a plurality of longitudinally arranged stations. Each station is adapted to receive one object to be wrapped. Means are provided for moving the conveyor longitudinally. A film stand is provided for supplying wrapping film longitudinally along the moving delivery conveyor in contact with the objects to be wrapped. The film has longitudinal peripheral edge portions that extent laterally and are sufficiently wide to wrap around the objects to be wrapped. A folder is mounted on the delivery conveyor and has side arms for folding the film edge portions along side the objects to partially wrap the objects. A gripping conveyor is located adjacent to the delivery conveyor to receive the partially wrap objects. The gripping conveyor includes a plurality of clamping devices spaced-apart longitudinally equidistantly with the delivery conveyor stations. Means are provided for moving the gripping conveyor and thus the clamping devices longitudinally in synchronization with the delivery conveyor. The clamping devices include opposed gripping fingers. Actuation means are provided for causing the gripping fingers to close to grip the received partially wrapped objects through the wrapping film. Crimping means are located between the clamping devices for crimping closed and cutting off the wrapping film between the wrapped objects. Also, the actuation means includes means for opening the gripping fingers to release the wrapped objects.

According to another aspect of the invention, there is provided a method of individually wrapping objects. The method comprises the steps of providing a moving conveyor and placing the objects to be wrapped on the conveyor at equal intervals. A continuous strip of wrapping film is placed in contact with the objects to be wrapped and the longitudinal edges of the film are folded along side the objects to partially wrap the objects. The partially wrapped objects are gripped through the wrapping film and the gripped objects are pulled off the conveyor. The wrapping film is crimped around the objects to complete the wrapping of the objects. The wrapping film is cut off between the objects and the wrapped objects are released.

According to yet another aspect of the invention, there is provided apparatus for feeding objects uniformly to a conveyor of a wrapping machine. The apparatus comprises a hopper having a floor pan and an upright peripheral wall. The floor pan has an opening for passing objects therethrough to the conveyor. A selector plate is located adjacent to the floor pan and has a plurality of holes therethrough for loosely accommodating the objects. Means are provided for moving the selector plate to cause the objects to enter the holes and for causing the holes to be located selectively over the peripheral opening. A spring finger is mounted in the peripheral wall and extends to engage and retain an object in the selected hole located over the peripheral opening. A piston is located opposite a selected selector plate hole located over the peripheral opening. Also, timed actuator means are provided for actuating the piston to push the object past the spring finger and through the peripheral opening.

BRIEF DESCRIPTION OF THE DRAWINGS

Preferred embodiments of the invention will now be described, by way of example, with reference to the accompanying drawings, in which.

DESCRIPTION OF THE PREFERRED EMBODIMENTS

Figure 1:
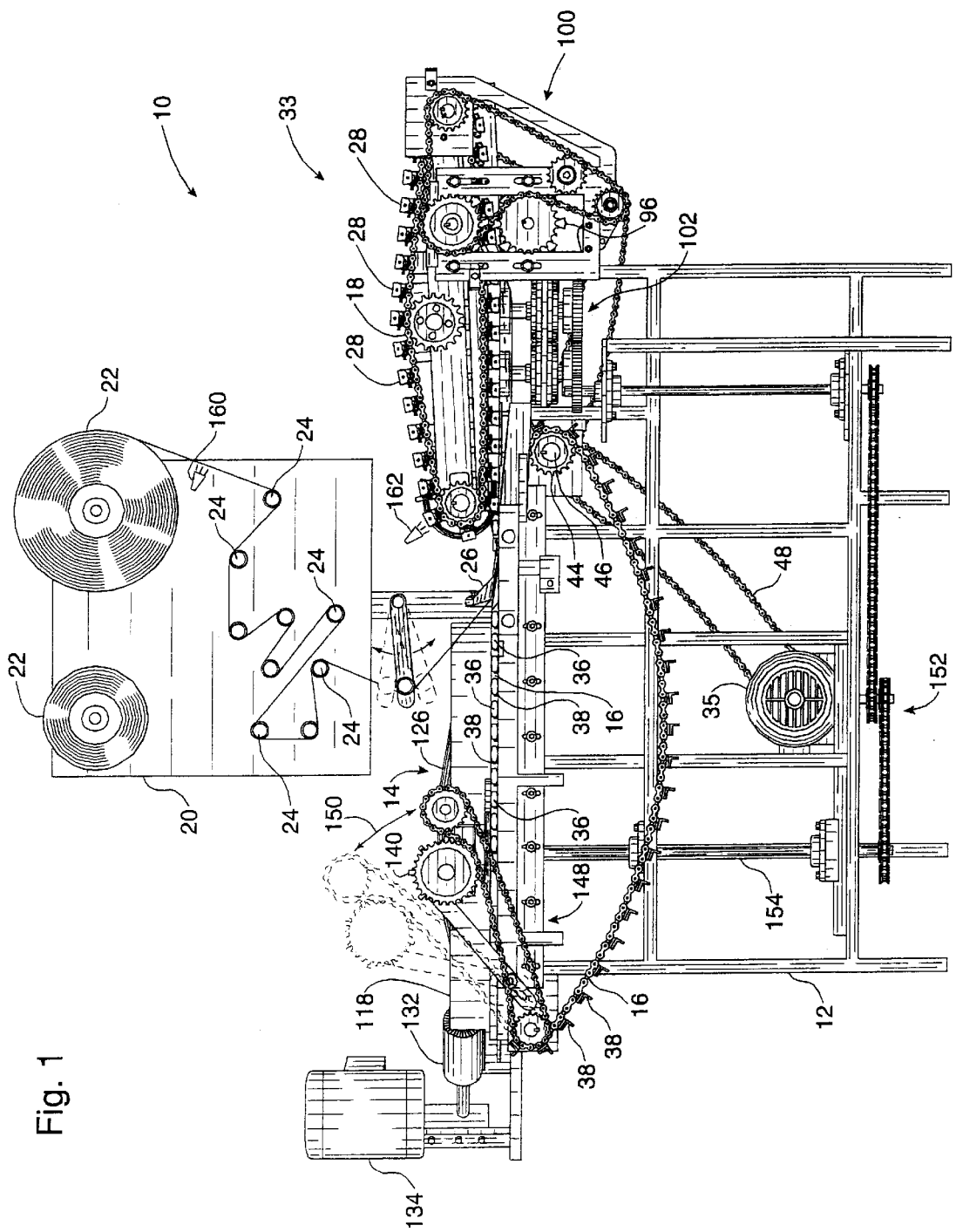
FIG. 1 is a front elevational view of a preferred embodiment of a wrapping machine according to the present invention.
Figure 2:
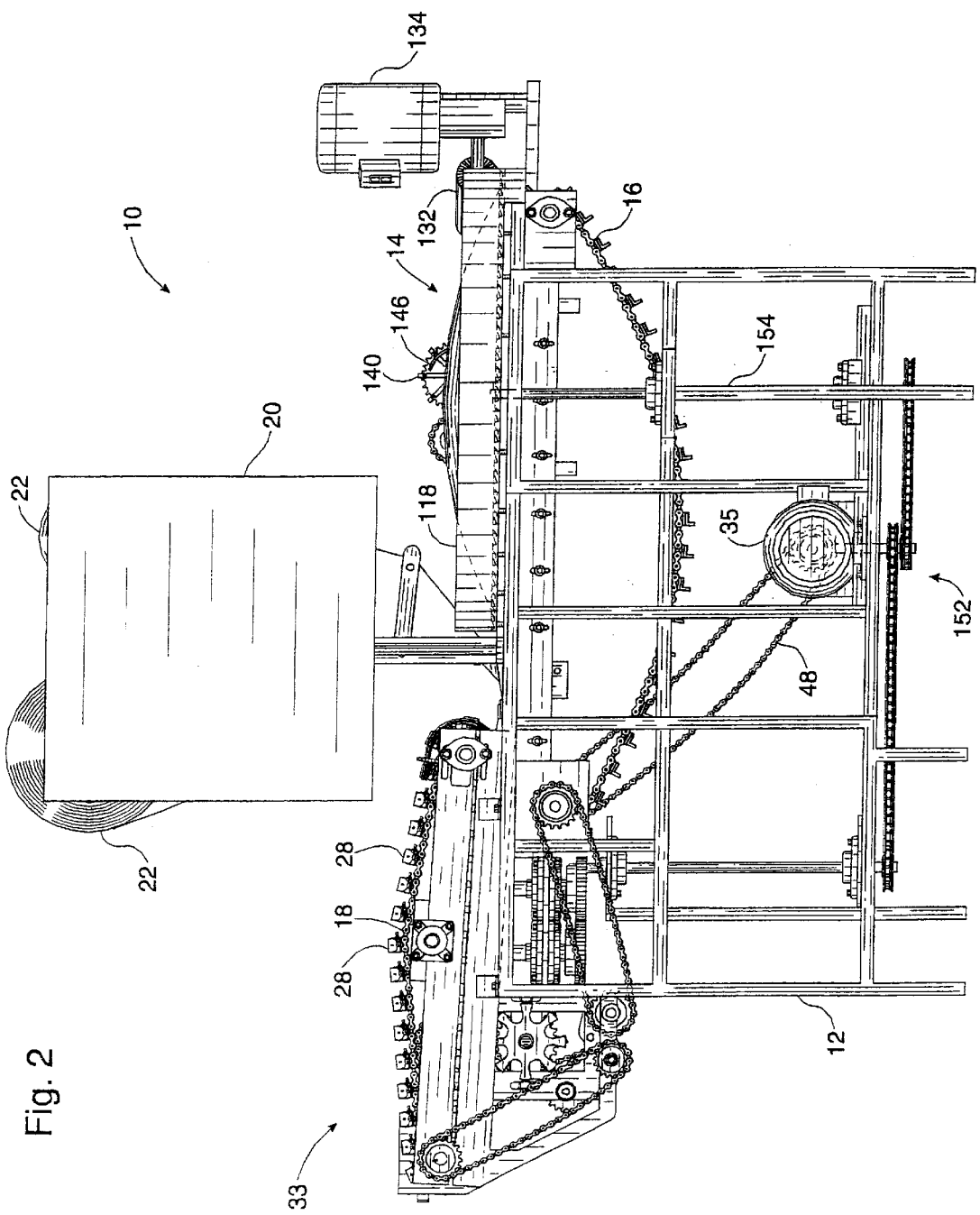
FIG. 2 is a rear elevational view of the machine shown in FIG. 1.

Referring firstly to FIGS. 1 and 2, a preferred embodiment of a wrapping machine according to the present invention is generally indicated by reference numeral 10. Wrapping machine 10 includes a table or base 12, a magazine or hopper or input tray 14 for receiving objects to be wrapped in machine 10. The objects can be food items, such as candies, or they could be any other objects that are desired to be wrapped individually. Preferably, however, the objects are generally uniform in size and relatively rigid or incompressible, although some resiliency in the objects would be tolerable as well.

Machine 10 also includes a delivery conveyor 16 for receiving the objects from input tray 14 and delivering same to a gripping conveyor 18. A film stand 20 contains rolls of wrapping film 22, one of which is led through a series of rollers 24 down to a folder 26, as described in more detail below in connection with FIG. 6. Folder 26 folds the longitudinal edges of film 22 downwardly over the objects on delivery conveyor 16 to partially wrap the objects. These partially wrapped objects are then fed into gripping conveyor 18, where the objects are gripped through the wrapping film by clamping devices 28. Gripping conveyor 18 then carries the objects and the wrapping film along through crimping wheels 30 where the longitudinal edges of the wrapping film are crimped and sealed together. Further crimping devices 32 and 34 (see FIG. 3) then transversely crimp and seal the wrapping film transversely between the objects being wrapped and also cut off the wrapping film to separate the wrapped objects, as will be described further below. Clamping devices 28 then open to release the wrapped objects. Machine 10 includes a drive motor 35, which drives all of the conveyors and crimping wheels in machine 10, also as will be described in further detail below.

Figure 3:
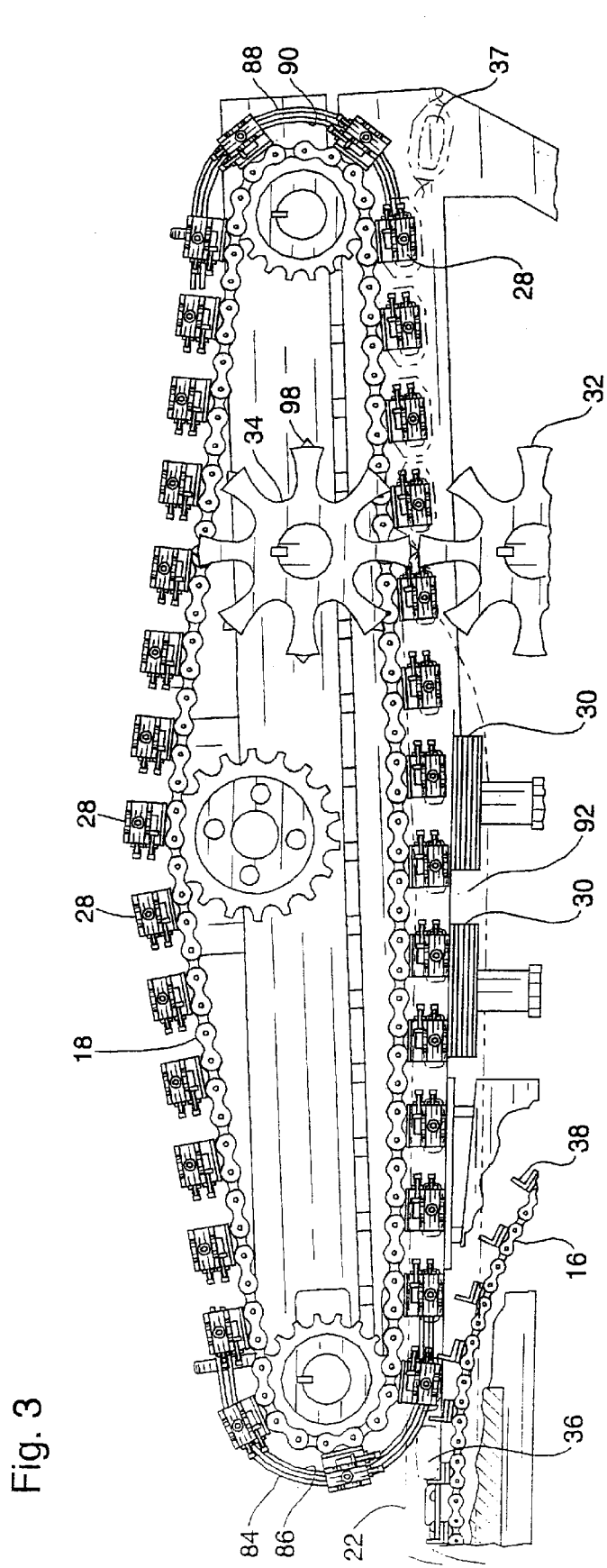
FIG. 3 is a vertical sectional view through the gripping conveyor of the machine of FIGS. 1 and 2.
Figure 4A:
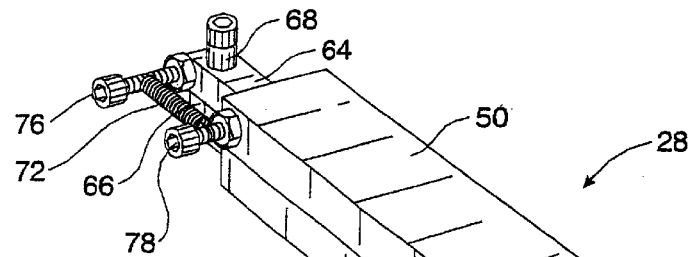
FIGS. 4A to 4C are enlarged perspective views of the gripping finger assemblies used in the gripping conveyor of FIG. 3, showing the operation of the gripping fingers.
Figure 4B:
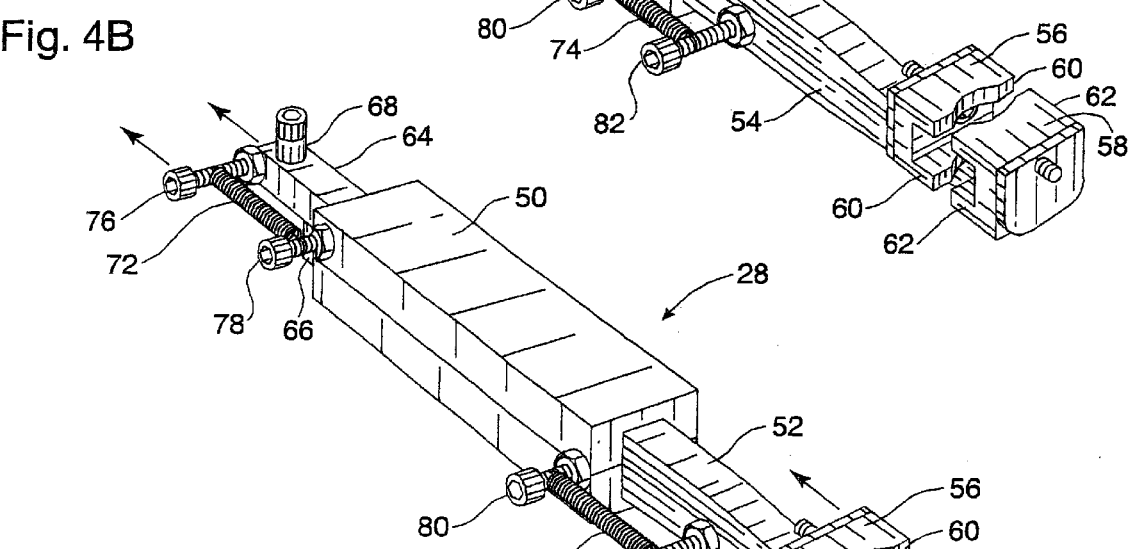
Figure 4C:
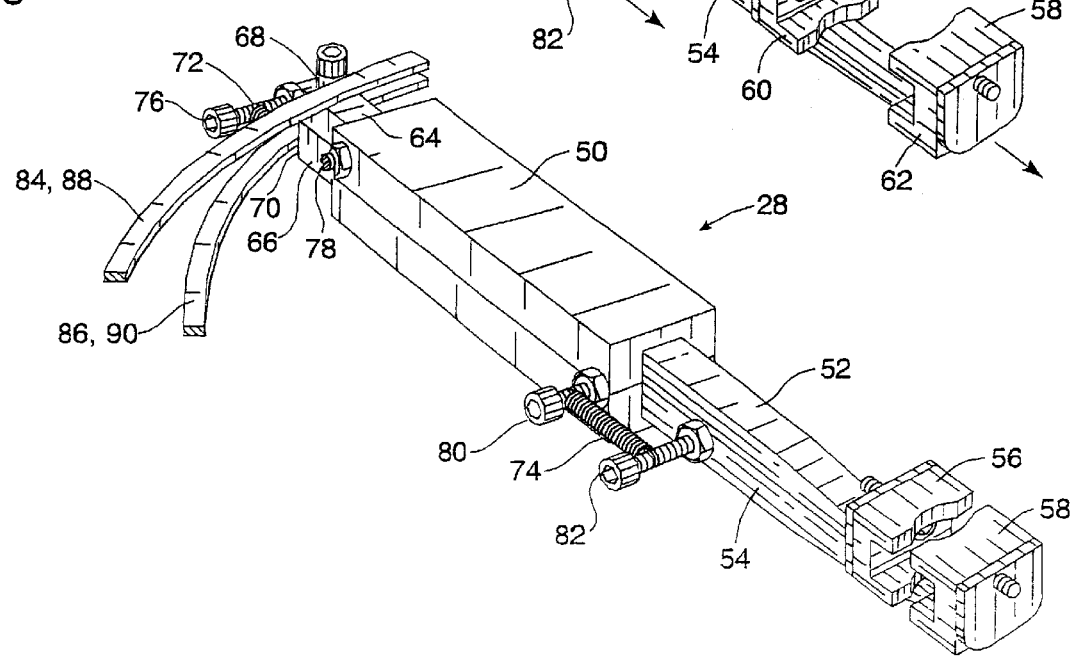
Figure 5:
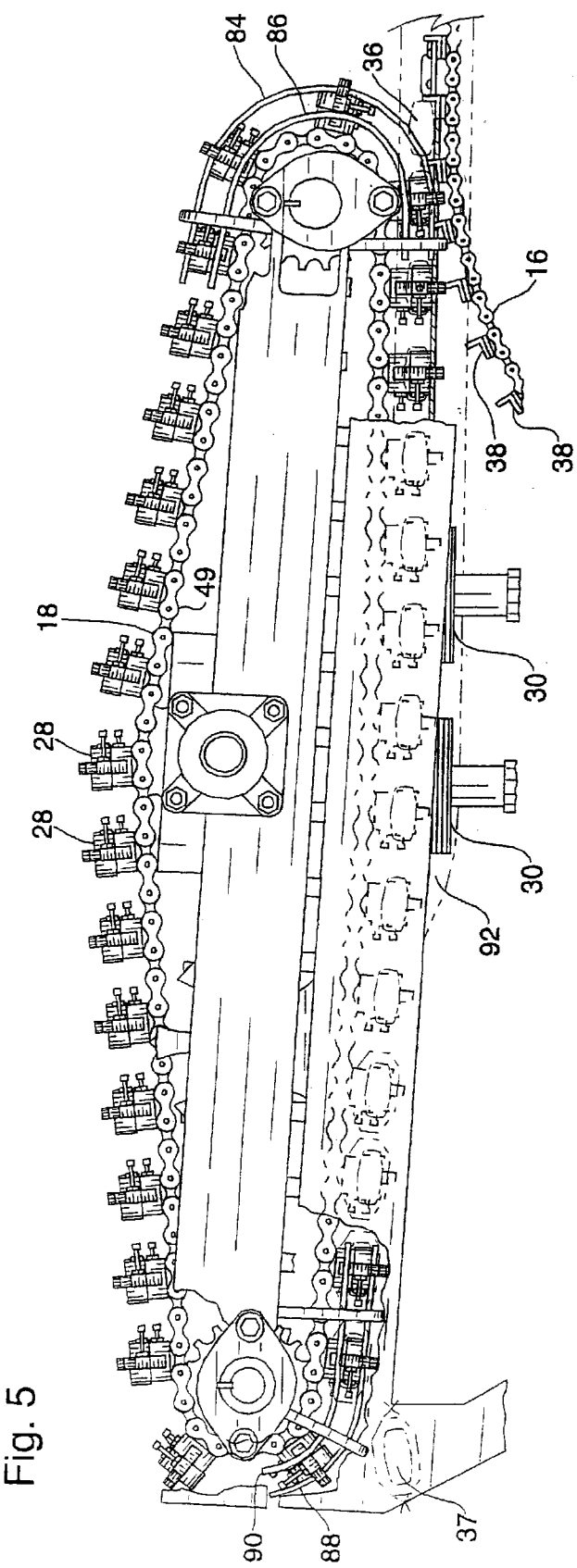
FIG. 5 is a rear elevational view, partly broken away of the gripping conveyor.

Referring next, in particular, to FIGS. 3 to 5, in addition to FIGS. 1 and 2, the gripping conveyor portion 33 of machine 10 will now be described in further detail. As seen best in FIGS. 3 and 5, delivery conveyor 16 delivers the objects to be wrapped, as indicated by dotted lines 36, to gripping conveyor 18. Delivery conveyor 16 is an endless, longitudinally movable belt in the form of a chain conveyor having a plurality of transverse, equi-spaced fingers or projections 38 mounted thereon. Projections 38 extend upwardly through a slot 40 (see FIG. 8) formed in an elongate table 42 mounted in machine base 12. The spaces between projections 38 form longitudinally arranged stations, each station being adapted to receive one object 36 to be wrapped. Delivery conveyor 16 is moved or driven longitudinally by a sprocket 44 (see FIG. 1) mounted on a shaft 46. Shaft 46 is driven by a drive chain 48 coupled to drive motor 35.

Gripping conveyor 18 is located adjacent to delivery conveyor 16 to receive objects 36, which are now partially wrapped. Referring again to FIG. 1, it will be recalled that the film 22 passes under folder 26 where the film edge portions are folded downwardly along side objects 36 to partially wrap the objects. Gripping conveyor 18 includes a plurality of clamping devices 28 spaced apart longitudinally equidistantly with the delivery conveyor stations or projections 38. Gripping conveyor 18 is an endless belt in the form of a conveyor chain 49 upon which are mounted clamping devices 28. Clamping devices 28 include guide blocks 50 which are attached to conveyor chain 49 and gripping fingers 52, 54 mounted in pairs in guide blocks 50 for transverse sliding movement therein. The gripping fingers 52 and 54 of each pair of gripping fingers 52, 54 include respective opposed jaws 56, 58 for gripping the partially wrapped objects 36 and holding same during the completion of the wrapping operation and severance of the wrapped objects. Jaws 56, 58 include U-shaped blocks having spaced-apart distal portions 60 and 62. Distal portions 60, 62 on respective opposed jaws 56, 58 face each other, and these distal portions 60 and 62 are concave to help hold objects 36 that are round or oblong in shape.

Jaws 56 and 58 are located at one end of gripping fingers 52, 54. The opposite ends of gripping fingers 52, 54 form cam end portions 64 and 66 that define cam followers. In fact, a transverse cam follower 68 is mounted in cam end portion 64, and the end 70 (see FIG. 4c) of cam end portion 66 actually forms a cam follower. FIG. 4c is the same as FIG. 4a with portions of FIG. 4a removed to show more clearly cam follower end 70.

Gripping fingers 52, 54 are spring biased into the closed position as indicated in FIG. 4a by springs 72 and 74. Spring 72 extends between cap screws 76 and 78 mounted respectively in cam end portion 64 and guide block 50. Similarly, spring 74 extends between cap screws 80 and 82 mounted respectively in guide block 50 and gripping finger 54. It will be appreciated that other bias means or ways to attach springs 72 and 74 could be employed in clamping devices 28, if desired.

Gripping fingers 52, 54 are actuated by a plurality of cams 84, 86 and 88, 90, as seen best in FIGS. 3 to 5. In between the cams, the jaws 56 and 58 are closed as indicated in FIG. 4A. Cam 84 bears against cam follower 68 to cause gripping finger 52 to retract, and cam 86 bears against cam follower end 70 to cause gripping finger 54 to extend, thus opening jaws 56, 58 as indicated in FIG. 4B. The open jaws are thus in a position to allow a partially wrapped object 36 to enter therebetween from delivery conveyor 16 as indicated at the left hand end of FIG. 3. When object 36 is in a position to be grasped by jaws 56, 58, cams 84, 86 allow the jaws to close and clamp onto object 36. Similarly, at the right hand end of gripping conveyor 18 as indicated in FIG. 3, cams 88, 90 cause gripping fingers 52, 54 to separate releasing a wrapped object 37. Cams 84, 86 and 88, 90 are adjustable longitudinally and transversely to adjust the opening and closing positions of clamping devices 28 and the width of opening of jaws 56 and 58.

As seen best in FIG. 3, between the time the objects 36 are gripped or grasped by clamping devices 28 as actuated by cams 84, 86 and the time the wrapped objects are released by the clamping devices 28 as actuated by cams 88, 90, crimping wheels 30 crimp together and seal the adjacent lower peripheral edge portions 92 of wrapping film 22. For this purpose, crimping wheels 30 can be heated, if required. Depending on the type of wrapping film used, in some applications only one set of crimping wheels 30 may be needed. After the lower peripheral edges 92 of the wrapping film are crimped together, a second pair of vertically arranged, opposed crimping and cut-off wheels 32, 34 transversely crimp and cut off the wrapping film between objects 36. Actually, cut-off wheel 34 has a plurality of radial fingers with transverse cutting blades 98 mounted therein, and cut-off wheel 32 has a plurality of radial fingers with transverse end surfaces that form anvils for blades 98 to cut the wrapping film. Again, cut-off wheels 32, 34 can be heated, if required. The first set of horizontally arranged, opposed crimped wheels 30 and the second set of vertically arranged, opposed cut-off wheels 32, 34 form crimping means located between clamping devices 28 for crimping closed and cutting off the wrapping film 22 between the wrapped objects 36.

Referring again to FIGS. 1 and 2, it will be seen that a chain and sprocket drive 100 is used to drive cut-off wheels 32, 34 and gripping conveyor 18. However, a gear train drive could be used as well, as will be appreciated by those skilled in the art. Similarly, a gear train drive 102 is used to drive crimp wheels 30, but another type of drive could be used for this purpose as well. Gripping conveyor 18, crimping wheels 30 and cut-off wheels 32, 34 are all driven in synchronization with delivery conveyor 16. However, position or speed adjustment between the various drives or components could be provided as well, as will be appreciated by those skilled in the art.

Figure 2A:
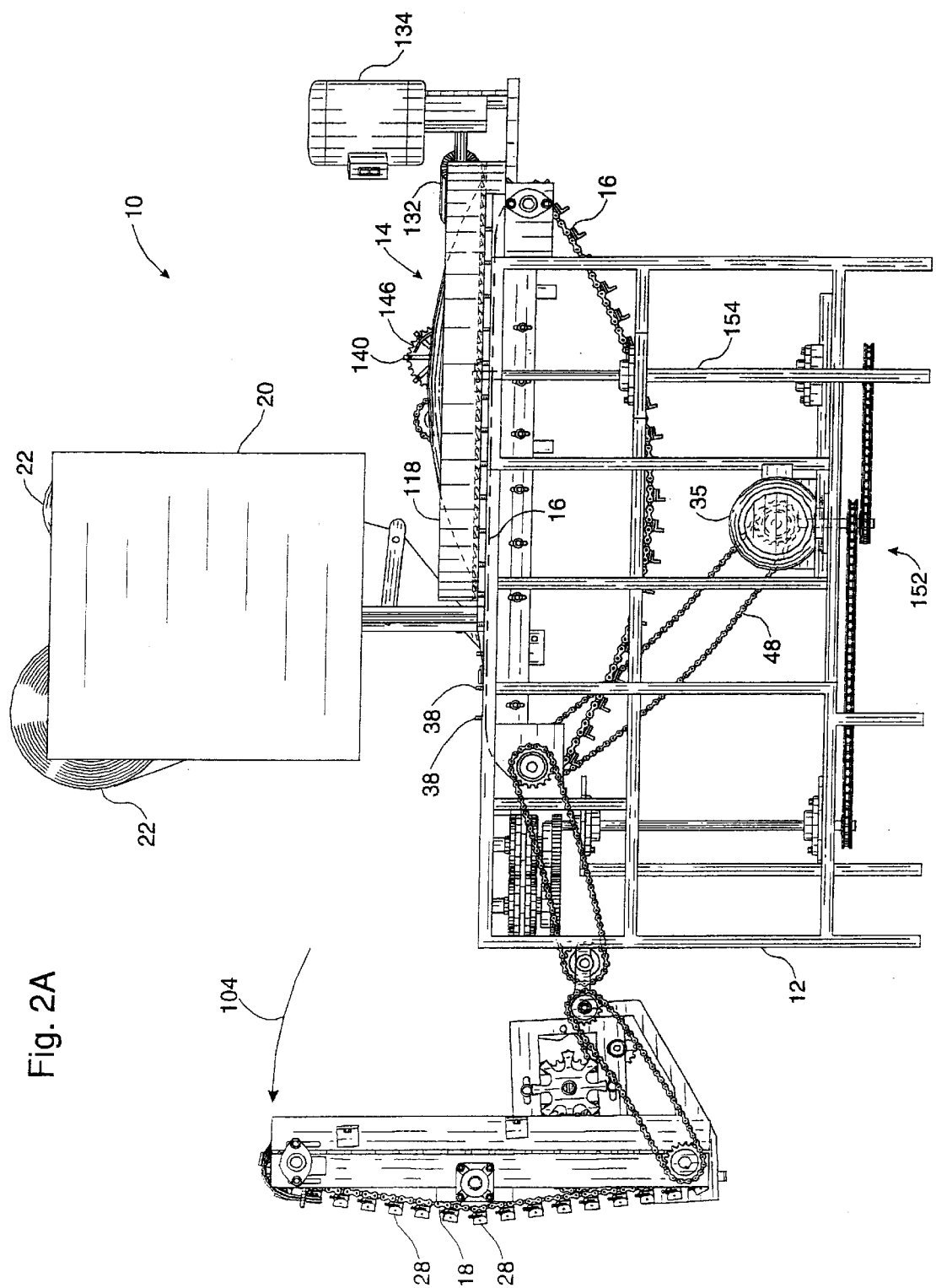
FIG. 2A is a rear elevational view similar to FIG. 2, but showing the gripping conveyor tilted up for cleaning and access purposes.

As indicated in FIG. 2A, gripping conveyor 18 swings up and out of the way as indicated by arrow 104 for cleaning purposes, or for helping to feed the wrapping film through the machine on start-up, and especially through crimping wheels 30 and cut-off wheels 32, 34.

Figure 6:
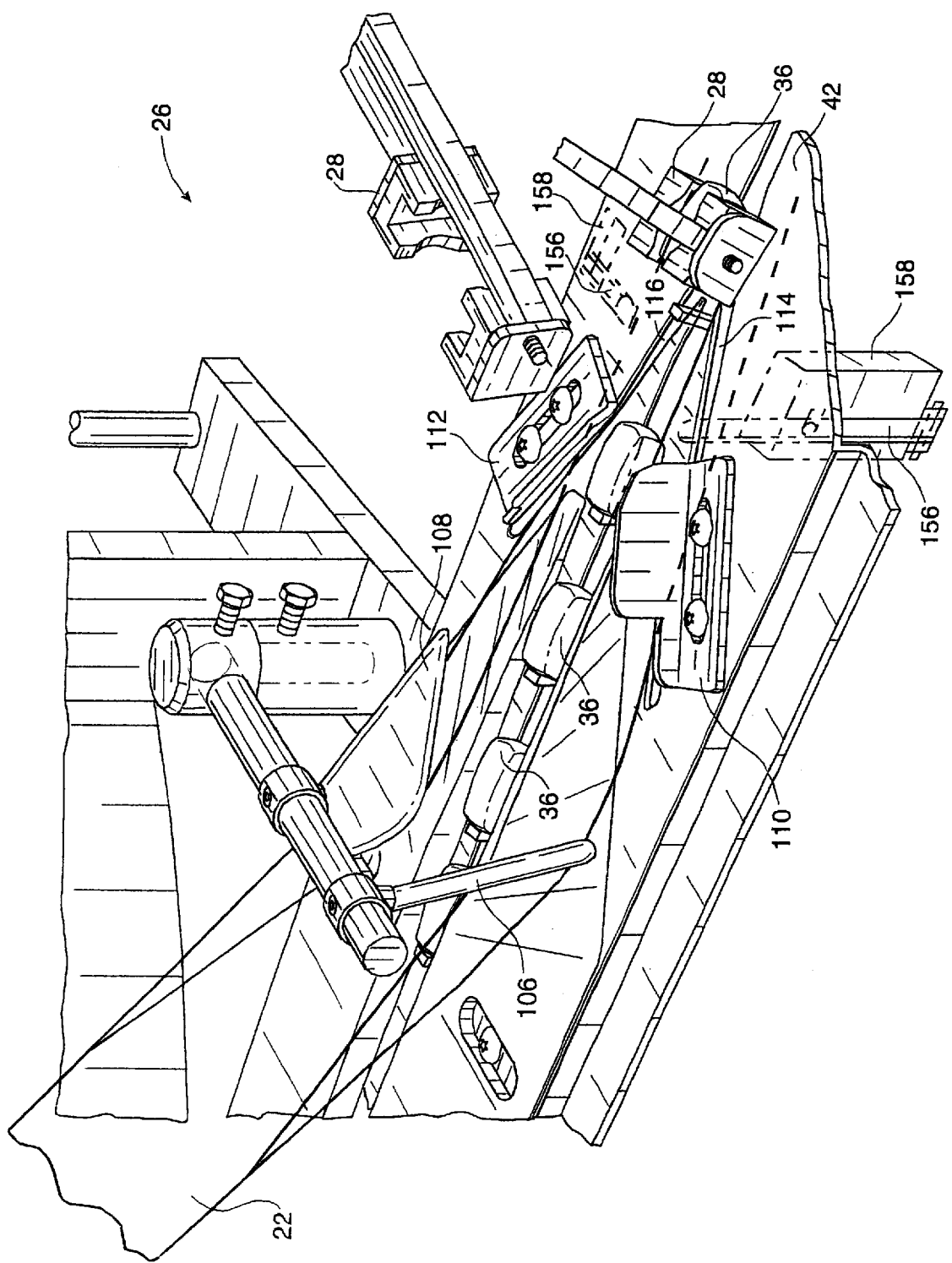
FIG. 6 is an enlarged perspective view of the folder used on the wrapping machine shown in FIG. 1.
Figure 7:
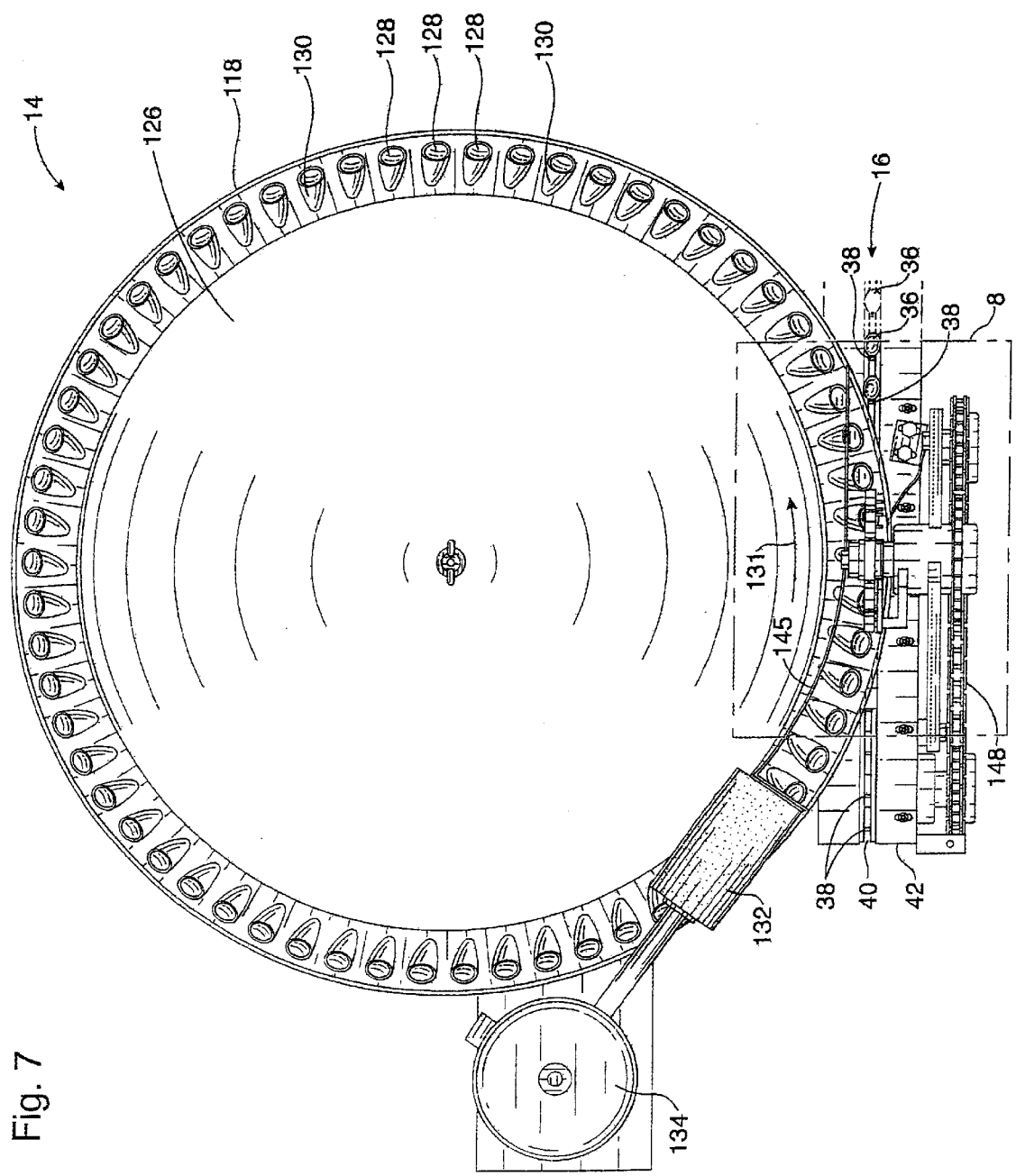
FIG. 7 is a plan view that the hopper section used to select and deliver the objects to be wrapped to the deliver conveyor in the machine of FIG. 1.

Referring next to FIG. 6, folder 26 will be described in further detail. Wrapping film 22 passes under folding wings 106, 108 to cause the longitudinal peripheral edge portions of wrapping film 22 to be folded downwardly along side objects 36 to partially wrap objects 36. Film 22 is sufficiently wide that the longitudinal peripheral edge portions thereof wrap around and hang below objects 36 to be crimped by crimping wheels 30, as discussed above. Folding wings or side arms 106, 108 are transversely adjustable to adjust this folding action. Additional adjustable guide plates 110, 112 assist in this folding and wrapping operation and cause the peripheral edges portions of wrapping film 22 to pass downwardly through slots 114, 116 to come together beneath object 36. FIG. 6 shows a partially wrapped object 36 about to be grasped by a clamping device 28, the remainder of gripping conveyor 28 being omitted from FIG. 6 for the purposes of clarity.

Referring next to FIGS. 7 to 10, the hopper or input tray portion 14 of wrapping machine 10 will now be described in further detail. Input tray assembly 14 is used to deposit objects 36 onto delivery conveyor 16 in a precise and controlled manner. Input tray 14 includes a circular hopper 118 having a floor pan 120 (see FIG. 9) and an upright peripheral wall 122. Floor pan 120 has an opening 124 adjacent to peripheral wall 122 for passing objects 36 therethrough to delivery conveyor 16. A selector plate 126 in the form of a conical disc is located adjacent to floor pan 120 and has a plurality of holes 128 located equidistantly around the periphery of selector plate 126. As conical selector plate 126 rotates, the holes 128 are selectively positioned over or located in registration with floor pan opening 124. Holes 128 are dimensioned to loosely accommodate objects 36 and tapered entry slots 130 assist the objects loaded into input tray 14 to fall into these holes 128. To assist in this, it will be noted that entry slots 130 are offset from the radial direction. Selector plate 126 rotates in the direction of arrow 131, so entry slots 130 lead into the feed of the objects in tray 14. Where the objects are not spherical, a rotating brush 132 driven by motor 134 is used to cause the objects to lie down flat in holes 128.

Figure 9:
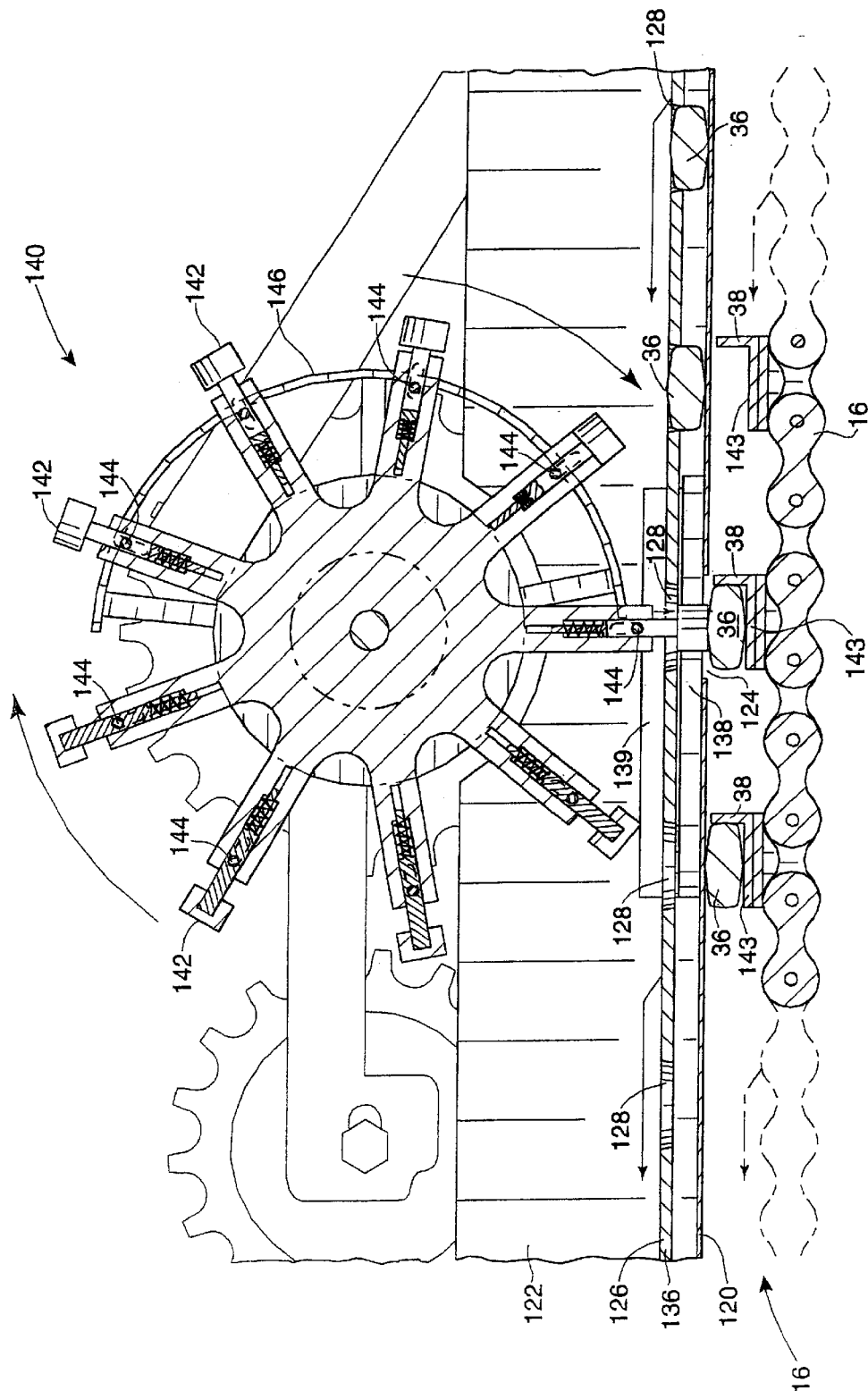
FIG. 9 is a vertical sectional view taken along lines 9—9 of FIG. 8.
Figure 10:
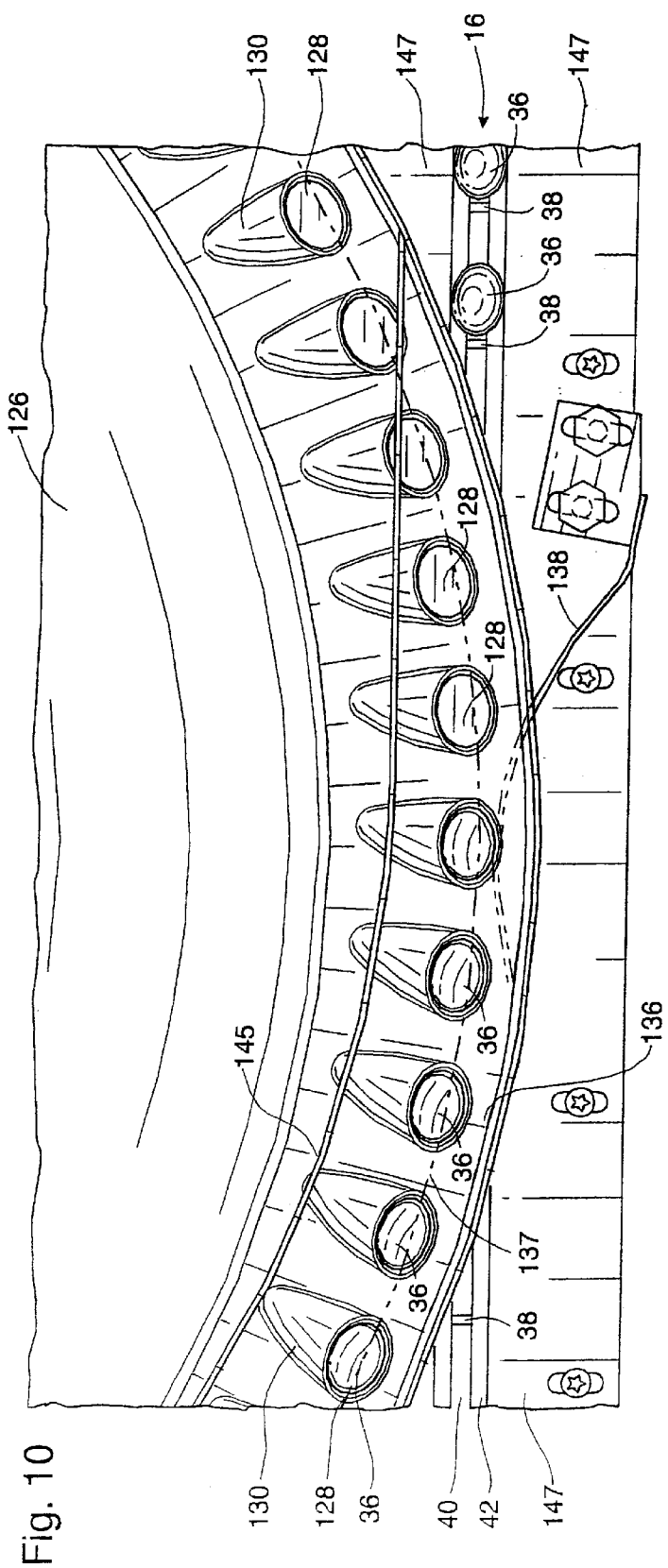
FIG. 10 is a plan view similar to FIG. 8,but with the ejector wheel and its drive removed for the purposes of illustration.

As seen best in FIGS. 9 and 10, selector plate 126 has a peripheral edge portion 136 that is undercut adjacent to holes 128, as indicated by dashed line 137 in FIG. 10. This edge portion 136 has a thickness that is less than objects 36, so that a portion of the objects 36 extends below selector plate 126 and slides along floor pan 120. A spring finger 138 extends through an opening 139 in peripheral wall 22 and engages the objects 36 preventing them from falling through floor pan opening 124 by themselves.

As seen best in FIG. 9, a rotatable ejector wheel 140 having a plurality of radially disposed pistons 142 is mounted adjacent to peripheral wall 122 of hopper or input tray 14. Ejector wheel 140 rotates in synchronization with selector plate 126 so that pistons 142 line up with respective holes 128 as they pass over opening 124. An aligned piston 142 is then actuated to eject or push the object 36 past spring finger 138 and through peripheral opening 124 onto delivery conveyor 16 in engagement with a projection 38. If desired, projections 38 can have resilient receiving portions 143 to cushion the landing of objects 36 as they fall onto projections 38. Pistons 142 have cam followers 144 (see FIGS. 8 and 9) that engage a cam 146, which together actuate the pistons. Cams 146 and cam followers 144 form timed actuator means for actuating pistons 142 to eject or push the objects 36 onto delivery conveyor 16. Pistons 142 are spring biased into the extended position and cam 146 acting on cam followers 144 causes the pistons to retract until they are just over a selected hole 128, at which time cam 146 ends allowing the release of the respective piston 146. However, a double acting cam could be used as will be appreciated by those skilled in the art, to operate the pistons in both directions. Also, a single piston could be used, or fewer or more pistons could be used, with appropriate changes to the rotational speed of ejector wheel 140. The rotation of ejector wheel 140, together with the operation of cam 146 and cam followers 144 forms timed actuator means for actuating the pistons to push the objects through to the delivery conveyor 16. The position of cam 146 is adjustable to vary the timing of pistons 142. It will be noted from FIGS. 7, 8 and 10 that a guard 145 is provided to prevent objects 36 from entering the area of ejector wheel 140 unless they are properly positioned in the holes 128.

Figure 8:
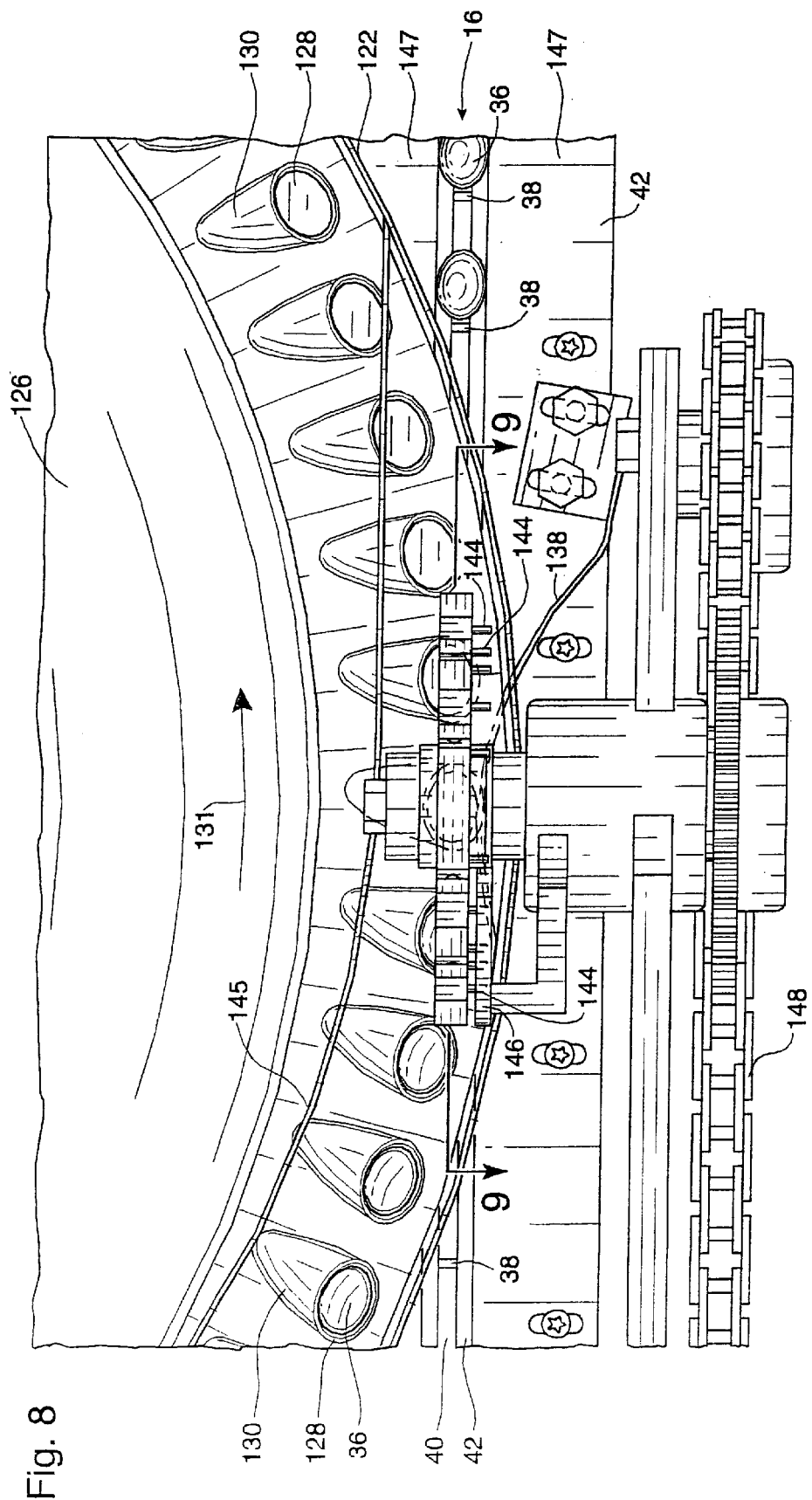
FIG. 8 is an enlarged plan view of the portion of FIG. 7 indicated by chain dotted line 8.

It will also be noted in FIG. 8 that delivery conveyor 16 includes laterally adjustable guideways 147 for guiding or directing objects 36 along conveyor 16.

As seen best in FIG. 1, ejector wheel 140 is driven by a suitable chain and sprocket drive 148, and the entire assembly is allowed to swing up as indicated by arrow 150 for cleaning purposes. Conical selector plate 126 is driven by a chain and sprocket drive 152. Selector plate 126 is mounted on a telescopic shaft 154 to allow selector plate 126 to lift up, also for cleaning purposes.

Referring again to FIG. 6, an oscillating film advancement mechanism in the form of pivoting fingers 156 located on the underside of table 42 may be provided to give a slight transverse push on wrapping film 22 where printed films are used in wrapping machine 10 and the film is subject to stretching. This transverse push prior to the following clamping device 28 closing, in effect, shortens or advances the wrapping film to compensate for any stretching and ensure that the film remains in registration in wrapping machine 10. Pivoting adjustment fingers 156 are actuated by solenoids 158 which are controlled by proximity sensors or photocells 160, 162. Sensor 160 is mounted on film stand 20 adjacent to wrapping film 22 (see FIG. 1) to detect film registration indicia. Sensor 162 is mounted adjacent gripping conveyor 18 to determine the position of clamping devices 28. Sensor 160 is used to determine if the film is out of registration, and the other sensor 162 determines if the film is stretching and too late for clamping devices 28. It will be appreciated that other mechanisms could be employed for this purpose as well.

In operation, a quantity of objects to be wrapped is loaded into hopper or input tray 14. The rotating conical selector plate 126 causes the objects to fall into holes 128. As the filled holes pass over floor pan opening 124, first of all, they are prevented from dropping therethrough by spring finger 138 until the precise time required, at which time a respective piston 142 is released or actuated to push the object down onto delivery conveyor 16. Film stand 20 and folder 26 then applies or places a continuous strip of wrapping film 22 on top of and in contact with objects 36 to be wrapped and folds the longitudinal edges of the film along side the objects to partially wrap the objects. The partial wrapped objects are then gripped through the wrapping film by the clamping devices 28, or at least the gripping fingers, 52, 54 thereof. Gripping conveyor 18 then pulls the gripped objects 36 off the delivery conveyor 16. The wrapping film is then crimped along the bottom edges to seal these peripheral edges and the wrapping film is transversely crimped and cut off between the objects. The clamping devices 28 are then opened to release the wrapped objects.

Having described preferred embodiments of the invention, it will be appreciated that various modifications may be made to the structures described above. For example, wrapping machine 10 is designed to wrap objects of a relatively uniform size and shape. Objects of different sizes and shapes can be accommodated with suitable modifications to the appropriate components. Many different types of drives could be used to operate the various conveyors and crimping wheels. Wrapping film 22 is shown to be applied on top of objects 36, but the film could be arranged differently and applied beneath the objects and folded upwardly along side the objects, or even applied sideways to the objects. Input tray 14 is shown to be horizontally orientated, but it could be on an angle. Similarly, the gripper conveyor could be orientated differently, depending on how the wrapping film is applied to the objects.

Wrapping machine 10 could be used without input tray 14 provided some other type of magazine or feed device is used to supply objects to delivery conveyor 16. Similarly, input tray 14 could be used by itself with another type of wrapping machine or device.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A wrapping machine for individually wrapping objects, comprising:

a delivery conveyor including a plurality of longitudinally arranged stations, each station being adapted to receive one object to be wrapped; means for moving the conveyor stations longitudinally; a film stand for supplying wrapping film longitudinally along the moving delivery conveyor in contact with the objects to be wrapped, the film having longitudinal peripheral edge portions extending laterally and being sufficiently wide to wrap around the objects to be wrapped; a folder mounted on the delivery conveyor and having side arms for folding the film edge portions alongside the objects to partially wrap the objects; a gripping conveyor located adjacent to the delivery conveyor to receive the partially wrapped objects, the gripping conveyor including a plurality of clamping devices spaced apart longitudinally equidistantly with the delivery conveyor stations; means for moving the gripping conveyor and thus the clamping devices longitudinally in synchronization with the delivery conveyor, the clamping devices including opposed gripping fingers; actuation means for causing the gripping fingers adjacent to the delivery conveyor to close to grip the partially wrapped objects through the wrapping film and pull said objects off the delivery conveyor; crimping means located between the clamping devices for crimping closed and cutting off the wrapping film between the wrapped objects; and said actuation means including means for opening the gripping fingers to release the wrapped objects.

2. A wrapping machine as claimed in claim 1 wherein the gripping conveyor includes an endless belt, and wherein the clamping devices include guide blocks mounted on the endless belt, the gripping fingers being mounted in pairs in the guide blocks for transverse sliding movement therein.

3. A wrapping machine as claimed in claim 2 wherein the gripping fingers of each pair of fingers include opposed jaws located at one end thereof for gripping the objects to be wrapped, and wherein the opposite ends of the gripping fingers form cam end portions defining cam followers.

4. A wrapping machine as claimed in claim 3 wherein the gripping finger actuation means includes a plurality of cams located to engage the gripping finger cam end portions to open and close the gripping finger jaws.

5. A wrapping machine as claimed in claim 4 wherein the gripping finger jaws include U-shaped blocks having spaced-apart distal portions, the distal portions on respective opposed jaws facing each other.

6. A wrapping machine as claimed in claim 4 wherein said distal portions are concave.

7. A wrapping machine as claimed in claim 3 wherein the clamping devices further include bias means mounted between the guide blocks and gripping fingers for urging the respective opposed jaws together to grip the objects to be wrapped.

8. A wrapping machine as claimed in claim 1 wherein the delivery conveyor includes an elongate channel having a central open slot and an endless longitudinally moveable belt having a plurality of transverse, equispaced projections extending through the slot to form said stations between the projections.

9. A wrapping machine as claimed in claim 1 and further comprising film advancement fingers located prior to the first closed clamping device adjacent to the delivery conveyor, sensor means for detecting film registration indicia, and activation means operatively coupled between the sensor means and the advancement fingers to cause the advancement fingers to engage and advance the film if the film is out of registration.

10. A wrapping machine as claimed in claim 9 wherein the crimping means includes a first pair of horizontally arranged, opposed crimping wheels for crimping the film longitudinal edge portions together, and a second pair of vertically arranged, opposed cut-off wheels for crimping and cutting off the wrapping film between the wrapped objects.

* * * * *